United States Patent
Lee et al.

(10) Patent No.: US 11,434,314 B2
(45) Date of Patent: Sep. 6, 2022

(54) METHOD FOR PREPARING 2-CYANOETHYL GROUP-CONTAINING POLYMER

(71) Applicant: LG Chem, Ltd., Seoul (KR)

(72) Inventors: Yong Man Lee, Daejeon (KR); Yoontae Hwang, Daejeon (KR); Dong Hoon Park, Daejeon (KR); Jin Young Ryu, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/956,918

(22) PCT Filed: Jul. 15, 2019

(86) PCT No.: PCT/KR2019/008719
§ 371 (c)(1),
(2) Date: Nov. 3, 2020

(87) PCT Pub. No.: WO2020/022681
PCT Pub. Date: Jan. 30, 2020

(65) Prior Publication Data
US 2021/0054114 A1    Feb. 25, 2021

(30) Foreign Application Priority Data

Jul. 23, 2018 (KR) .................. 10-2018-0085442
Jul. 12, 2019 (KR) .................. 10-2019-0084310

(51) Int. Cl.
*C08F 8/30* (2006.01)
*C08F 16/06* (2006.01)

(52) U.S. Cl.
CPC ............... *C08F 8/30* (2013.01); *C08F 16/06* (2013.01)

(58) Field of Classification Search
CPC .................. C08F 8/30; C08F 16/06
See application file for complete search history.

(56) References Cited

U.S. PATENT DOCUMENTS

| 2,941,990 | A |   | 6/1960 | Schuller |
| 3,432,512 | A |   | 3/1969 | Halpern |
| 4,322,524 | A |   | 3/1982 | Onda et al. |
| 4,438,262 | A | * | 3/1984 | Murase ............... C08B 11/155 127/31 |
| 2003/0144540 | A1 |  | 7/2003 | Starner et al. |
| 2012/0258348 | A1 |  | 10/2012 | Hayakawa et al. |
| 2012/0258349 | A1 |  | 10/2012 | Hayakawa et al. |
| 2012/0258350 | A1 |  | 10/2012 | Fukui et al. |
| 2012/0259067 | A1 |  | 10/2012 | Fukui et al. |
| 2017/0237005 | A1 |  | 8/2017 | Weitz et al. |
| 2019/0085102 | A1 |  | 3/2019 | Han et al. |

FOREIGN PATENT DOCUMENTS

| EP | 0076698 A2 | 4/1983 |
| GB | 2199834 A | 7/1988 |
| JP | S60197704 A | 10/1985 |
| JP | S63023903 A | 2/1988 |
| JP | H02252791 A | 10/1990 |
| JP | H09225284 A | 9/1997 |
| JP | H09227172 A | 9/1997 |
| JP | H09228291 A | 9/1997 |
| KR | 20030051337 A | 6/2003 |
| KR | 20120113675 A | 10/2012 |
| KR | 20120113676 A | 10/2012 |
| KR | 20120113677 A | 10/2012 |
| KR | 101634416 B1 | 6/2016 |
| KR | 20170042358 A | 4/2017 |
| KR | 20170130108 A | 11/2017 |
| KR | 20180075912 A | 7/2018 |
| KR | 20190106121 A | 9/2019 |
| WO | 2018184145 A1 | 10/2018 |

OTHER PUBLICATIONS

Extended European Search Report including Written Opinion for Application No. 19840417.0 dated Mar. 30, 2021, 8 pages.
International Search Report for Application No. PCT/KR2019/008719 dated Nov. 6, 2019, 2 pages.
Li, et al., "Synthesis and Hydrolysis of b-Cyanoethyl Ether of Poly(vinyl alcohol)", Journal of Applied Polymer Science, Sep. 23, 1999, pp. 2771-2777, vol. 73, No. 13.

* cited by examiner

*Primary Examiner* — Mark S Kaucher
(74) *Attorney, Agent, or Firm* — Lerner, David, Littenberg, Krumholz & Mentlik, LLP

(57) ABSTRACT

A method for preparing a 2-cyanoethyl group-containing polymer is provided. The method can prepare a purified 2-cyanoethyl group-containing polymer with high purity even while a reduced amount of water was used during the purification process, thus reducing the amount of wastewater generated.

9 Claims, No Drawings

METHOD FOR PREPARING 2-CYANOETHYL GROUP-CONTAINING POLYMER

CROSS-REFERENCE TO RELATED APPLICATION(S)

The present application is a national phase entry under 35 U.S.C. § 371 of International Application No. PCT/KR2019/008719 filed Jul. 15, 2019 which claims priority from Korean Patent Application No. 10-2018-0085442 filed on Jul. 23, 2018 and Korean Patent Application No. 10-2019-0084310 filed on Jul. 12, 2019 in the Korean Intellectual Property Office, the disclosures of which are incorporated herein by reference in their entirety.

TECHNICAL FIELD

The present disclosure relates to a method for preparing a 2-cyanoethyl group-containing polymer which can prepare a purified 2-cyanoethyl group-containing polymer with high purity even while reducing the amount of water used during the purification process and thus reducing the amount of wastewater generated.

BACKGROUND

Recently, lithium secondary batteries have been applied to various applications/fields. In particular, as capacity and energy density of lithium secondary batteries increase, there are growing concerns for ensuring the heat resistance of separators.

In this regard, as a technique for preventing the short circuit caused by heat shrinkage or heat melting of a separator and improving reliability of a battery, a multilayer separator comprising a heat-resistant porous layer on one or both surfaces (i.e., frond and back surfaces) of a porous substrate having fine pores such as a polyethylene-based film is suggested.

In such a separator, the heat-resistant porous layer widely uses an inorganic material and a 2-cyanoethyl group-containing polymer as a dispersant for uniformly dispersing the inorganic material.

Such a 2-cyanoethyl group-containing polymer can be typically produced by reacting acrylonitrile and a hydroxyl group-containing compound such as polyvinyl alcohol under basic conditions in which a catalyst including a caustic soda (NaOH) or the like is used. In addition, as a reaction medium for the progress of these reactions, a solvent including acetone is typically used. As the reaction proceeds, a hydroxyl group can be substituted with a cyanoethyl ether group to prepare a 2-cyanoethyl group-containing polymer such as cyanoethyl polyvinyl alcohol.

However, such a reaction process inevitably generates unreacted materials of acrylonitrile, residual metal salts derived from catalysts, and by-products such as bis-cyanoethyl ether (BCE), and these are included in a crude product including the 2-cyanoethyl group-containing polymer.

Thus, in order to remove unreacted materials, residual metal salts, by-products and the like from the crude product including the 2-cyanoethyl group-containing polymer, after completion of the reaction, a method of extracting the 2-cyanoethyl group-containing polymer by a washing step using a large amount of water was applied. However, in such an extraction process, in order to sufficiently remove the unreacted materials, residual metal salts, by-products and the like, not only a multi-step extraction process is needed, but also in that process, more than 50 times more water is used than the 2-cyanoethyl group-containing polymer. This is because at the time of the substitution reaction, the hydroxyl group-containing compound and the catalyst are used in the form of an aqueous solution and thus, a large amount of water is already contained in the crude product, and also the 2-cyanoethyl group-containing polymer formed by the substitution reaction has a relatively low solid content concentration of about 5 to 10% by weight. For this reason, even in a single extraction process, a large amount of water must be used for precipitation/purification of the polymer.

As a result of the use of a large amount of water in this way, after the progress of the extraction process, malignant wastewater (especially, nitrogen-containing wastewater) including unreacted materials of acrylonitrile, residual metal salts derived from the catalyst, and by-products such as bis-cyanoethyl ether are inevitably produced in a large amount, and in order to purify such wastewater, very high process costs are required. Moreover, due to the extraction process using water at the multi-stage, there is a disadvantage that the process energy consumption is also very large.

Accordingly, there is a need to develop a technology capable of obtaining a purified 2-cyanoethyl group-containing polymer with high purity while reducing the amount of water used during the purification/extraction process and thus reducing the amount of wastewater generated.

DETAILED DESCRIPTION OF THE INVENTION

Technical Problem

The present disclosure provides a method for preparing a 2-cyanoethyl group-containing polymer which can prepare a purified 2-cyanoethyl group-containing polymer with high purity similar to the case of using a large amount of water, even while reducing the amount of water used during the purification process and thus reducing the amount of wastewater generated.

Technical Solution

In one aspect of the present disclosure, there is provided a method for preparing a 2-cyanoethyl group-containing polymer comprising the steps of:

reacting acrylonitrile and a hydroxyl group-containing compound to form a crude product including a 2-cyanoethyl group-containing polymer; and extracting the crude product with an extraction solvent including an organic solvent to form a purified 2-cyanoethyl group-containing polymer, wherein the organic solvent has a Hansen solubility parameter distance for the 2-cyanoethyl group-containing polymer of 6.8 or more, and wherein the organic solvent has a Hansen solubility parameter distance for acetone of 13.0 or less.

Hereinafter, a method of preparing a 2-cyanoethyl group-containing polymer according to specific embodiments of the present disclosure will be described in more detail.

According to one embodiment of the present disclosure, there is provided a method for preparing a 2-cyanoethyl group-containing polymer comprising the steps of:

reacting acrylonitrile and a hydroxyl group-containing compound to form a crude product including a 2-cyanoethyl group-containing polymer; and extracting the crude product with an extraction solvent including an organic solvent to form a purified 2-cyanoethyl group-containing polymer, wherein the organic solvent has a Hansen solubility parameter distance for the 2-cyanoethyl group-containing polymer of 6.8 or more, and wherein the organic solvent has a Hansen solubility parameter distance for acetone of 13.0 or less.

As a result of continuous experiments, the present inventors have found that as an organic solvent satisfying a specific range of solubility parameter distances is used as an extraction solvent, it is possible to obtain a purified cyanoethyl group-containing polymer with high purity even while using no water or greatly reducing the amount of water used in the extraction process, thereby completing the present disclosure.

As evidenced by the examples below, it was confirmed that as a result of using the organic solvent as an extraction solvent, unreacted materials of acrylonitrile, residual metal salts derived from derived from catalysts, and by-products such as bis-cyanoethyl ether can be effectively removed/purified from a crude product of the polymer, similar to a conventional technique using a large amount of water.

This is expected because while the organic solvents including the solubility parameter are well mixed with the solvent used as a reaction medium such as acetone, the solvent may serve as a non-solvent for the 2-cyanoethyl group-containing polymer. As a result, it has been found that as only unreacted materials, residual metal salts and/or by-products are selectively dissolved in a solvent used as the reaction medium, without being mixed with the 2-cyanoethyl group-containing polymer, it is possible to obtain a high purity 2-cyanoethyl group-containing polymer in which the unreacted materials/residual metal salts/by-products are almost completely removed in the extraction process using such an organic solvent.

Thus, during the existing extraction process, water can be completely or at least partially replaced with such an organic solvent, and thereby, it is possible to prepare a purified 2-cyanoethyl group-containing polymer with high purity similar to the conventional technique even while reducing the amount of water generated during the extraction/purification process and thus reducing the amount of wastewater generated.

Hereinafter, the method for preparing a 2-cyanoethyl group-containing polymer according to one embodiment will be described for each step.

In the preparation method of one embodiment, first, acrylonitrile is reacted with a hydroxyl group-containing compound to form a crude product including a 2-cyanoethyl group-containing polymer. This reaction step may be performed in accordance with a general method for preparing a 2-cyanoethyl group-containing polymer, which will be briefly described below.

In this reaction step, the polymer can be prepared, for example, by Michael addition reaction between acrylonitrile and a hydroxyl group-containing compound (polymer) in the molecule as shown in the following Reaction Scheme.

[Reaction Scheme]

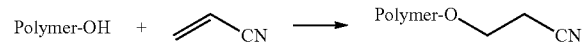

in Reaction Scheme above, Polym-OH represents a hydroxyl group-containing compound (polymer), and Polym-O—CH$_2$—CH$_2$—CN represents a 2-cyanoethyl group-containing polymer.

More specifically, the 2-cyanoethyl group-containing polymer can be prepared, for example, by dissolving a compound having a hydroxyl group in the molecule in water, adding a catalyst such as caustic soda and/or sodium carbonate, and then adding acrylonitrile thereto and carrying out the reaction at about 0 to about 60° C. for about 2 to about 12 hours.

At this time, acrylonitrile may be added in an amount of 1 to 10 parts by weight, or 5 to 10 parts by weight, based on 100 parts by weight of the hydroxyl group-containing compound.

Further, in the above reaction step, acrylonitrile may function also as a solvent, but a dilution solvent such as acetone that does not react with acrylonitrile can be optionally added.

However, the present disclosure is not limited to the above-mentioned reaction conditions, and specific reaction conditions, such as temperature, time, and content of reactants, can vary in terms of adjusting the ratio of substitution by cyanoethyl groups.

Meanwhile, after forming a crude product including a 2-cyanoethyl group-containing polymer through the above-mentioned reaction steps, a step of extracting the crude product with an extraction solvent including an organic solvent is performed to form a purified 2-cyanoethyl group-containing polymer.

More specifically, after completion of the above reaction, the reaction solution is separated into two layers of an aqueous layer and an organic layer including the 2-cyanoethyl group-containing polymer, and the organic layer is taken out, and the extraction solvent is added thereto to allow a crude product to precipitate, thereby obtaining a purified 2-cyanoethyl group-containing polymer.

In the method of one embodiment, as the extraction solvent, a specific organic solvent in which a Hansen solubility parameter distance for the 2-cyanoethyl group-containing polymer is 6.8 or more and a Hansen solubility parameter distance for acetone is 13.0 or less can be used.

In this case, the Hansen solubility parameter may be defined and calculated as a solubility parameter distance (Ra, radius of the Hansen Solubility Sphere) of the organic solvent for the 2-cyanoethyl group-containing polymer or acetone. The method of calculating the Hansen solubility parameter for each solvent thus defined, and the Hansen solubility parameter distance for the 2-cyanoethyl group-containing polymer or acetone are well known (see HANSEN SOLUBILITY PARAMETERS, A User's Handbook).

More specifically, the Hansen solubility parameter distance may be calculated according to Equation 1 using the solubility parameter values for each solvent and the solubility parameter values for acetone and 2-cyanoethyl group-containing polymers summarized in this Handbook:

$$Ra = (4\Delta D^2 + \Delta P^2 + \Delta H^2)^{1/2} \qquad \text{[Equation 1]}$$

wherein,

Ra is a solubility parameter distance of each solvent for the 2-cyanoethyl group-containing polymer or acetone which is defined as the solubility parameter distance, $\Delta D$ is the distance (difference value) of the dispersion (nonpolar) cohesion parameter for the solvent and the dispersion (nonpolar) cohesion parameter for the 2-cyanoethyl group-containing polymer or acetone, ΔP is the distance (difference value) between a dispersion cohesion parameter for a solvent and a polar cohesion parameter for 2-cyanoethyl group-containing polymer or acetone, and ΔH is the distance (difference value) between a polar cohesion parameter for a solvent and a polar cohesion parameter for 2-cyanoethyl group-containing polymer or acetone, In particular, the organic solvent used in the method of the one embodiment may have a characteristic that the Hansen solubility parameter distance for the 2-cyanoethyl group-containing polymer is 6.8 or more, or 7.0 or more, or 6.8 to 13.0 or 7.0 to 10.0. Thereby, it shows immiscibility with the 2-cyanoethyl group-containing polymer which can be defined as a non-solvent therefor.

Further, the organic solvent may have a characteristic that the Hansen solubility parameter distance for acetone is 13.0 or less, or 12.5 or less, or 2.0 to 12.5 or 5.0 to 12.5. This may mean that the organic solvents are well mixed with the solvent used as the reaction medium such as acetone.

As the extraction step is carried out using an organic solvent exhibiting these two characteristics, the organic solvent is not mixed with the 2-cyanoethyl group-containing polymer, and only unreacted materials, residual metal salts and/or by-products in the solvent used as the reaction medium are selectively dissolved, thereby obtaining a high-purity 2-cyanoethyl group-containing polymer from which unreacted materials/residual metal salts/by-products have been almost completely removed during the extraction process, Meanwhile, the above two characteristic values for various organic solvents are summarized in Tables 1 and 2 below.

TABLE 1

| sample | S.P. | HSP(D) | HSP(P) | HSP(H) | Ra |
|---|---|---|---|---|---|
| 2-cyanoethyl group-containing polymer (ratio of substitution: 80%; cyano resin single unit: [CH$_2$CH(OH)]0.2 + [CH$_2$CH(OCH$_2$CH$_2$CN)]0.8) | 21 | 16.2 | 11 | 8.8 | 0 |
| Acetone | 19.9 | 15.5 | 10.4 | 7 | 2.4 |
| Methyl ethyl ketone | 19.1 | 16 | 9 | 5.1 | 4.2 |
| Methyl isobutyl ketone | 17 | 15.3 | 6.1 | 4.1 | 7.0 |
| n-butanol | 23.2 | 16 | 5.7 | 15.8 | 8.8 |
| Isopropyl alcohol | 23.6 | 15.8 | 6.1 | 16.4 | 9.1 |
| Water | 30.1 | 18.1 | 17.1 | 16.9 | 10.8 |
| Ethanol | 26.5 | 15.8 | 8.8 | 19.4 | 10.9 |
| Toluene | 18.2 | 18 | 1.4 | 2 | 12.3 |

TABLE 2

| Sample | S.P. | HSP(D) | HSP(P) | HSP(H) | Ra from Ace |
|---|---|---|---|---|---|
| Acetone | 19.9 | 15.5 | 10.4 | 7 | 0 |
| Methyl ethyl ketone | 19.1 | 16 | 9 | 5.1 | 2.6 |
| Methyl isobutyl ketone | 17 | 15.3 | 6.1 | 4.1 | 5.2 |
| Isopropyl alcohol | 23.6 | 15.8 | 6.1 | 16.4 | 10.4 |
| n-butanol | 23.2 | 16 | 5.7 | 15.8 | 10.0 |
| Toluene | 18.2 | 18 | 1.4 | 2 | 11.4 |
| Ethanol | 26.5 | 15.8 | 8.8 | 19.4 | 12.5 |

S.P.: Hansen solubility parameter
HSP(D): Dispersion cohesion parameter
HSP(P): Polar cohesion parameter
HSP(H): Hydrogen bonding cohesion parameter
Ra: Solubility parameter distance of each solvent for the 2-cyanoethyl group-containing polymer which is defined as a solubility parameter distance
Ra from Ace: Hansen solubility parameter distance of the organic solvent for acetone In consideration of the respective characteristic values of Tables 1 and 2, as the organic solvent in the extraction step, for example, one or more selected from the group consisting of isopropyl alcohol, n-butanol, methanol, ethanol, toluene, and methyl isobutyl ketone can be used. Among them, an appropriate solvent can be selected and used in consideration of the type, final substitution ratio, etc. of the 2-cyanoethyl group-containing polymer to be finally produced. However, among them, in consideration of immiscibility with the 2-cyanoethyl group-containing polymer, miscibility with the reaction medium such as acetone and/or solubility of unreacted materials/residual metal salts/by-products, alcohol solvents may be preferably used, and isopropyl alcohol may be most preferably used.

Meanwhile, the extraction solvent may be used in an amount of 80 to 500 parts by weight, or 100 to 400 parts by weight, or 150 to 300 parts by weight based on 100 parts by weight of the crude product, based on a single extraction step. Thereby, it is possible to preferably maintain the efficiency of the extraction step without excessively increasing the amount of the extraction solvent used.

Further, the extraction solvent may include only the above-mentioned organic solvent, or may include other solvents such as water together with the organic solvent. In order to maintain the extraction/purification efficiency according to the specific organic solvent, the organic solvent is used in an amount of 20 to 100% by weight, or 50 to 100% by weight, or 70 to 100% by weight of the extraction solvent, and the residual amount of water and other solvents may be used as needed.

Meanwhile, in the above-mentioned extraction step, the extraction solvent may include the specific organic solvent alone, but a mixed solvent of such an organic solvent and water may be used. The extraction step may be performed a plurality of times, for example, two to seven times, or two to five times.

In a specific example of this extraction method, the extraction solvent includes the organic solvent alone, and the extraction step may be performed two to five times, or three to four times.

In another specific example of the extraction method, the extraction solvent includes a mixed solvent of the organic solvent and water, and the extraction step may be performed two to five times, or three to four times.

And, in the specific examples of the extraction method described above, the extraction step may be performed only by the step using an extraction solvent containing the organic solvent, but in addition to this, the step of extracting with water may be further performed once to three times.

Specific examples of such extraction methods may be appropriately selected in consideration of specific types of 2-cyanoethyl group-containing polymers, substitution ratios, other process variables, and the like. In any of these methods, the amount of water used can be greatly reduced compared to the existing process, and thus, the amount of wastewater generated and the process cost/energy for the treatment thereof can be greatly reduced.

Meanwhile, examples of the 2-cyanoethyl group-containing polymer that can be produced through the above-described processes may be cyanoethyl polysaccharides such as cyanoethyl pullulan, cyanoethyl cellulose, cyanoethyldihydroxypropyl pullulan, cyanoethylhydroxyethyl cellulose, cyanoethylhydroxypropyl cellulose, cyanoethyl starch, or cyanoethylpolyvinyl alcohol and the like. The type of the 2-cyanoethyl group-containing polymer may vary depending on the type of the hydroxyl group-containing compound, and the cyanoethyl polyvinyl alcohol can be obtained by using a polyvinyl alcohol polymer as the hydroxyl group-containing compound.

Further, the ratio of substitution by cyanoethyl groups in the 2-cyanoethyl group-containing polymer may be 70 to 90%, and the weight average molecular weight may be 100,000 to 600,000. It can be appropriately used as a dispersant in a separator by complex factors, such as the ratio of substitution by cyanoethyl groups in the above range, and the molecular weight of the polymer.

Meanwhile, the ratio of substitution by cyanoethyl groups may be represented by the ratio (%) of mole number of hydroxyl groups substituted with cyanoethyl groups to mole number of hydroxyl groups present per monomer unit of the hydroxyl group-containing compound which is a starting raw material.

Meanwhile, the ratio of substitution by cyanoethyl groups in the 2-cyanoethyl group-containing polymer is improved by preparing an aqueous solution of a hydroxyl group-containing compound such as polyvinyl alcohol in the process of preparing the 2-cyanoethyl group-containing polymer, and then adding an aqueous solution of a catalyst such as caustic soda. Such ratio of substitution can be calculated based on the nitrogen content of the 2-cyanoethyl group-containing polymer as measured by a Kjeldahl method.

The purified 2-cyanoethyl group-containing polymer prepared by the method of the one embodiment may include by-products containing bis-cyanoethyl ether (BCE) in an amount of less than 0.05% by weight, or 0.03% by weight or less, based on the total weight of the polymer.

Further, the purified 2-cyanoethyl group-containing polymer may contain less than 10 ppmw, or less than 5 ppmw of residual metal salts derived from catalysts or the like based on the total weight of the polymer, and unreacted materials containing acrylonitrile can be contained in an amount of less than 0.05% by weight, or less than 0.02% by weight.

Thus, by applying the method of the one embodiment, all or part of water in the extraction process is replaced with a specific organic solvent, whereby the amount of water used and the amount of wastewater generated can be significantly reduced, and even with this reduced amount of water used, a purified 2-cyanoethyl group-containing polymer with high purity can be obtained. Such a high purity 2-cyanoethyl group-containing polymer can be very preferably used as a dispersant for separators of lithium secondary batteries and the like.

Advantageous Effects

As described above, as the present disclosure uses an extraction solvent including a specific organic solvent, it provides a method for preparing a 2-cyanoethyl group-containing polymer which can prepare a purified 2-cyanoethyl group-containing polymer with high purity similar to the case of using a large amount of water, even while reducing the amount of water used during the purification process and thus reducing the amount of wastewater generated.

DETAILED DESCRIPTION OF THE EMBODIMENTS

Hereinafter, the present disclosure will be described in more detail with reference to the following Examples. However, the following Examples are for illustrative purposes only, and the invention is not intended to be limited by these Examples.

The ratio of substitution by cyanoethyl groups was calculated by the ratio of mole number of hydroxyl groups originally present per repeating unit of the polymer after determining the nitrogen content of the cyanoethylated polyvinyl alcohol produced in the following Synthesis Example through the Kjeldahl Method.

The weight average molecular weight value was analyzed by GPC, and the measurement conditions of GPC are as follows.

Apparatus: Gel permeation chromatography GPC (measuring instrument name: Alliance e2695; manufacturer: WATERS)
Detector: Differential Refractive Index Detector (measuring instrument name: W2414; manufacturer: WATERS)
Column: DMF column
Flow rate: 1 mL/min
Column temperature: 65° C.
Injection volume: 0.100 mL
Sample for standardization: polystyrene Synthesis Example 1

1 part by weight of polyvinyl alcohol (PVA), 6 parts by weight of acrylonitrile (AN), and 1.32 parts by weight of a 1 wt % aqueous solution of caustic soda were charged into a reactor equipped with a stirrer, and reacted at 50° C. for 100 minutes. 10 parts by weight of acetone and 3 parts by weight of water were added thereto, the mixture was stirred for 40 minutes, and then 0.088 parts by weight of a 25 wt % aqueous solution of acetic acid was added to terminate the reaction.

(ratio of substitution by cyanoethyl: 79%, MW: 408 K)

Synthesis Example 2

1 part by weight of a 20 wt % aqueous solution of polyvinyl alcohol (PVA), 0.02 part by weight of a 30 wt % aqueous solution of caustic soda, and 1.5 parts by weight of acrylonitrile (AN) were charged into a reactor equipped with a stirrer, and reacted at 50° C. for 50 minutes. 5 parts by weight of acetone was added thereto, and then stirred for 50 minutes, followed by further addition of acetic acid to terminate the reaction.

Examples 1 to 4

100 parts by weight of the crude product of the 2-cyanoethyl group-containing polymer obtained in Synthesis Example 1 was charged into a reactor containing 100 parts by weight of organic solvents (types of solvent used in each Example are summarized in Table 3 below) to allow a cyanoethyl group-containing polymer (cyanoethyl polyvinyl alcohol) to precipitate. After the precipitated polymer was re-dissolved in 30 parts by weight of acetone, the organic solvent precipitation process was performed once more. After extraction twice, the polymer dissolved in acetone was charged into a reactor containing 150 parts by weight of water and re-precipitated. Subsequently, a purified polymer was obtained through a drying step.

Comparative Example 1

100 weight part of the crude product of the 2-cyanoethyl group-containing polymer obtained in Synthesis Example 1 was charged into a reactor containing 500 weight part of water, to allow a 2-cyanoethyl group-containing polymer (cyanoethyl polyvinyl alcohol) to precipitate. The subsequent step was carried out in the same manner as in Examples 1 to 4 to obtain a purified polymer.

The contents of residual unreacted materials (AN) and by-products (bis-cyanoethyl ether, BCE) in the polymers obtained after the first extraction step in Examples 1 to 4 and Comparative Example 1 were analyzed/identified by gas chromatography, and the content of residual metal salts was analyzed/identified using an ICP mass spectrometer.

More specifically, the residual unreacted materials and by-products were analyzed using GC-FID (manufacturer: Agilent) after diluting the polymer with DMF, and the content of residual metal salts in the extracted product was measured using an ICP-OES (measuring instrument name: Optima 8300; manufacturer Perkinelmer) spectrometer. These analysis/identification results are summarized in Table 3 below:

TABLE 3

|  |  | Unreacted materials in polymer (wt %) | By-products in polymer (wt %) |
|---|---|---|---|
|  | Crude product | 9.32 | 10.58 |
| Example 1 | 1st extraction with toluene | 1.52 | 3.15 |
| Example 2 | 1st extraction with ethanol | 1.90 | 3.10 |
| Example 3 | 1st extraction with n-butanol | 2.15 | 4.04 |
| Example 4 | 1st extraction with isopropyl alcohol | 1.48 | 3.50 |
| Comparative Example 1 | 1st extraction with water | 4.57 | 5.01 |

Referring to Table 3, it was confirmed that in Examples 1 to 4, the first extraction step was performed with a specific organic solvent, and thus, the content of by-products/unreacted materials could be further reduced even compared to the extraction using water.

Example 5

100 parts by weight of the crude product of the 2-cyanoethyl group-containing polymer obtained in Synthesis Example 2 was charged into a reactor containing 100 parts by weight of an isopropyl alcohol solvent and 300 parts by weight of water to allow a 2-cyanoethyl group-containing polymer (cyanoethyl polyvinyl alcohol) to precipitate. After the precipitated polymer was re-dissolved in 30 parts by weight of acetone, an extraction process using a mixed solvent of isopropyl alcohol/water, and an acetone re-dissolution process were further repeated two more times. Subsequently, a purified polymer was obtained through a drying step.

Comparative Example 2

100 parts by weight of the crude product of the 2-cyanoethyl group-containing polymer obtained in Synthesis Example 2 was charged into a reactor containing 500 parts by weight of water to allow a 2-cyanoethyl group-containing polymer (cyanoethyl polyvinyl alcohol) to precipitate. After the precipitated polymer was re-dissolved in 30 parts by weight of acetone, the extraction process using water and the acetone re-dissolution process were repeated five times. Subsequently, a purified polymer was obtained through a drying step.

The contents of the isopropyl alcohol in Example 5, a polymer finally obtained after a third extraction using water, residual unreacted materials (AN) and by-products (bis-cyanoethyl ether, BCE) in the polymer obtained in each of Example 4 and Comparative Example 2 were analyzed/identified by gas chromatography, and the content of residual metal salts was analyzed/identified using an ICP mass spectrometer. Gas chromatography and ICP analysis apparatus/method were applied in the same manner as in Examples 1 to 4 described above.

The analysis/identification results and the amount of solvent (water) used in Examples/Comparative Examples are summarized in Table 4 below:

TABLE 4

|  |  | Amount of solvent (water) used (L) | Unreacted materials in polymer (wt %) | By-products in polymer (wt %) | Metal salts in polymer (ppmw) |
|---|---|---|---|---|---|
|  | Crude product |  | 9.32 | 10.58 | 3,490 |
| Example 4 | #1: 1st extraction with isopropyl alcohol |  | 1.48 | 3.50 | 630 |
|  | #2: 2nd extraction with isopropyl alcohol |  | 0.55 | 0.44 | 40 |
|  | #3: 3rd extraction with water | 150 | 0.01 | 0.01 | <5 |
| Example 5 | 3rd extraction with isopropyl alcohol/water | 900 | 0.01 | 0.03 | <5 |
| Comparative Example 2 | 5th extraction with water | 2500 | 0.01 | 0.03 | <5 |

Referring to Table 4, it was confirmed that in Examples 4 and 5, the content of by-products/unreacted materials/residual metal salts could be reduced similar to those of Comparative Example 2 to obtain a high-purity 2-cyanoethyl group-containing polymer. Furthermore, it was confirmed that in Examples, the amount of water used (amount of wastewater generated) could be significantly reduced compared with Comparative Examples.

The invention claimed is:

1. A method for preparing a 2-cyanoethyl group-containing polymer comprising:

reacting acrylonitrile and a hydroxyl group-containing compound under basic conditions in the presence of a catalyst including a caustic soda (NaOH), to form a crude product including a 2-cyanoethyl group-containing polymer, unreacted acrylonitrile, a metal salt, and a byproduct; and extracting the crude product with an extraction solvent including an organic solvent to form a purified 2-cyanoethyl group-containing polymer, wherein the organic solvent has a Hansen solubility parameter distance for the 2-cyanoethyl group-containing polymer of 6.8 or more, wherein the organic solvent has a Hansen solubility parameter distance for acetone of 13.0 or less, wherein the hydroxyl group-containing compound includes a polyvinyl alcohol-based polymer and the 2-cyanoethyl group-containing polymer is cyanoethyl polyvinyl alcohol, wherein the extraction is performed two to five times, and wherein the extraction further comprises extracting the crude product with water, or the extraction solvent includes a mixed solvent of the organic solvent and water.

2. The method for preparing a 2-cyanoethyl group-containing polymer according to claim 1, wherein the organic solvent includes one or more selected from the group consisting of isopropyl alcohol, n-butanol, methanol, ethanol, toluene, and methyl isobutyl ketone.

3. The method for preparing a 2-cyanoethyl group-containing polymer according to claim 1, wherein the extraction solvent is used in an amount of 80 to 500 parts by weight based on 100 parts by weight of the crude product, and the organic solvent is used in an amount of 20 to 100% by weight of the extraction solvent.

4. The method for preparing a 2-cyanoethyl group-containing polymer according to claim 1, wherein the 2-cyanoethyl group-containing polymer has a weight average molecular weight of 100,000 to 600,000, and a ratio of substitution by cyanoethyl groups is 70 to 90%.

5. The method for preparing a 2-cyanoethyl group-containing polymer according to claim 1, wherein the purified 2-cyanoethyl group-containing polymer includes less than 0.05% by weight of by-products containing acrylonitrile.

6. The method for preparing a 2-cyanoethyl group-containing polymer according to claim 1, wherein the purified 2-cyanoethyl group-containing polymer includes less than 0.05% by weight of by-products containing bis-cyanoethyl ether (BCE).

7. The method for preparing a 2-cyanoethyl group-containing polymer according to claim 1, wherein the purified 2-cyanoethyl group-containing polymer contains less than 10 ppmw of residual metal salts.

8. The method for preparing a 2-cyanoethyl group-containing polymer according to claim 1, wherein the organic solvent has the Hansen solubility parameter distance for the 2-cyanoethyl group-containing polymer of 6.8 to 13.0.

9. The method for preparing a 2-cyanoethyl group-containing polymer according to claim 1, wherein the organic solvent has the Hansen solubility parameter distance for acetone of 5.0 to 13.

* * * * *